No. 746,141. PATENTED DEC. 8, 1903.
A. G. PARK.
SUPPORTING STAND.
APPLICATION FILED NOV. 21, 1902.
NO MODEL.

Witnesses.

Inventor.
Allan G. Park
By Benedict Morsell & Green.
Attorneys.

No. 746,141. Patented December 8, 1903.

UNITED STATES PATENT OFFICE.

ALLAN G. PARK, OF MADISON, WISCONSIN.

SUPPORTING-STAND.

SPECIFICATION forming part of Letters Patent No. 746,141, dated December 8, 1903.

Application filed November 21, 1902. Serial No. 132,203. (No model.)

*To all whom it may concern:*

Be it known that I, ALLAN G. PARK, residing at Madison, in the county of Dane and State of Wisconsin, have invented a new and useful Improvement in Supporting-Stands, of which the following is a description, reference being had to the accompanying drawings, which are a part of this specification.

My invention has relation to improvements in supporting-stands especially intended for supporting tea-kettles, coffee-pots, or other receptacles containing heated liquids or substances.

The object of the invention is to provide a simple, cheap, and ornate device adapted to rest on a table or other medium and to support a receptacle, the device being of such construction as to prevent the heat from the heated contents of the receptacle from being transmitted to the supporting-table.

With the above primary object and other incidental objects in view the invention consists of the devices and parts or their equivalents, as hereinafter set forth.

Figure 1:
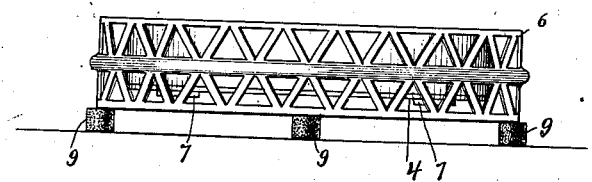
Figure 2:
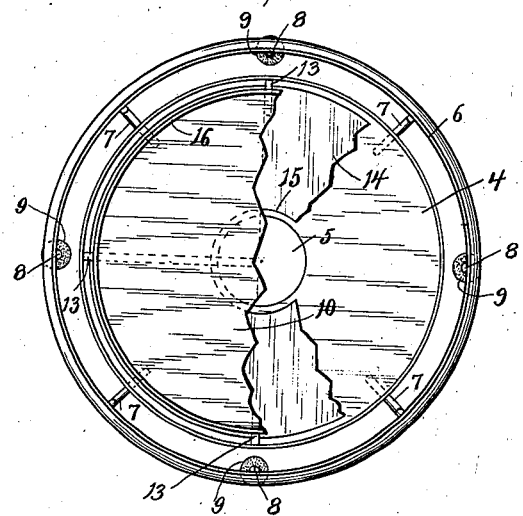
Figure 3:
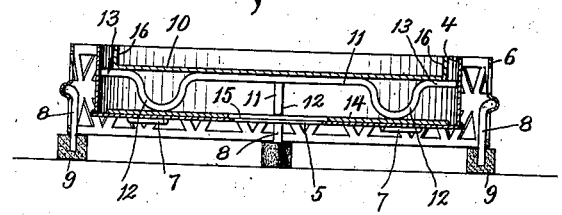

In the accompanying drawings, Figure 1 is an elevation of the complete device. Fig. 2 is a plan view thereof, parts being broken away; and Fig. 3 is a transverse section of the device.

Referring to the drawings, the numeral 4 indicates a cup-like device, the bottom thereof provided with an opening 5. Surrounding the upwardly-extending flange of the cup-like device and at a desired distance therefrom and preferably extending slightly below the bottom of the cup-like device is a rim 6, advisably of open-work. This rim is connected to the cup-like device by short thin arms 7, connected at their outer ends to the rim and at their inner ends to the cup-like device. The stand is supported on the table or other medium by means of legs 8, the lower ends of said legs preferably extending into blocks 9, composed of any suitable non-heat-conducting material, such as felt, so as to prevent the heat from passing down the legs to the table. The legs by preference extend downwardly from the rim 6; but it is obvious that they could extend downwardly from the cup-like device without departing from the spirit and scope of my invention.

The supporting-plate upon which the kettle or receptacle rests is indicated by the numeral 10. This plate is disposed in the cup-like device above the bottom of said device, so as to leave a space beneath the plate. Any suitable form of means for supporting the plate above the bottom of the cup-like device may be provided. In the drawings I show for the purpose arms 11, which cross each other centrally and are provided with downwardly-bent portions 12, which rest on the bottom of the cup-like device, and thereby serve to support the plate in a raised position above the bottom of said cup-like device. The edge of the supporting-plate is removed from the upwardly-extending flange of the cup-like device, so as to leave a clear space or passage. In order to retain the plate against movement horizontally, I provide said plate with projecting fingers 13, the outer ends of which bear against the inner side of the flange of the cup-like device, and thereby hold the plate against movement horizontally, so as to preserve the space between the flange and the edge of the plate, but yet permit of the vertical withdrawal of the supporting-plate from the cup-like device when desired. For convenience where the intersecting arms 11 are employed said arms may extend outwardly to form the projecting fingers 13, as shown in the drawings.

On the upper side of the bottom of the cup-like device may be placed a sheet or pad of asbestos 14, provided with a central opening 15, which registers with the opening of the bottom of the cup-like device. This sheet or pad of asbestos serves as a guard to prevent the bottom of the cup-like device from being heated.

In the use and application of my invention, when a pot or receptacle containing a heated liquid—such as tea, coffee, or the like—or a receptacle having heated contents of any other character is placed on the supporting-plate 10 it is impossible for the heat to be transmitted to the table or other medium on which the stand is supported by reason of the particular construction of my device, as hereinbefore described. It will be seen that provision is made for a free circulation of cool air, inasmuch as said air is permitted to pass beneath the lower edge of the outer rim 6; and also through the openings thereof to the space beneath the bottom of the cup-like device, and thence rise upwardly through the opening 5 of said bottom, thence circulate in the space beneath the supporting-plate, and thence pass upwardly through the space between the flange of the cup-like device and the outer edge of the supporting-plate. This provision for the circulation of cool air not only provides against the table being injured by heat, but also serves as a means for assisting in carrying the heated air upwardly. The outer rim 6 is made of open-work, so as to afford not only a series of openings for the passage of cool air beneath the bottom of the cup-like device, but also to provide openings through which heated air may escape laterally. Of course instead of being composed of open-work this rim might be provided with a series of openings or apertures formed in any other manner.

It will be evident, further, from my improved construction that the heated air has very little opportunity to be transmitted to the outer rim 6, inasmuch as said rim is connected to the cup-like device by the small thin legs 7, and that even should the outer rim become heated the heat would not be transmitted to the table, owing to the fact that the lower ends of the supporting-legs 8 extend into the felt blocks 9, and these felt blocks rest directly on the table.

While I have shown in the accompanying drawing the supporting-plate 10 as of circular form, yet it may be of any other desired shape or configuration without departing from my invention, and the same is equally true of the cup-like device and the outer rim.

It will be seen from the drawings that the supporting-plate 10 is on a plane slightly below the upper edge of the flange of the cup-like device. This is preferable, inasmuch as thereby a suction is created and a better circulation of air secured in consequence thereof.

In the circulation of the cool air said air not only has an opportunity to pass upwardly through the opening 5 in the bottom of the cup-like device, but also to pass upwardly in the space between the outer side of the flange of said cup-like device and the inner side of the rim 6.

While I have described the part 4 as being of cup-like form, yet I do not wish to be understood as confining myself thereto, inasmuch as merely a bottom plate might be provided upon which the supporting-plate rests in a raised position thereabove, and, if desired, means employed for holding said plate against horizontal movement on the bottom piece, and such variation I would deem to be within the spirit and scope of my invention. The outer rim 6 might also be omitted and the supporting-legs made to depend from the bottom piece without departing from the spirit of my invention.

I furthermore prefer to provide the outer edge of the supporting-plate 10 with an upwardly-extending flange 16, the upper edge of said flange being advisably on the same plane as the upper edge of the flange of the cup-like device. The inner plate being constructed in this way, a better draft is created for the cold air to pass upward through the center hole in the bottom of the cup-like device, and it also serves to prevent any leakage or overflow from the receptacle supported on the plate 10 from reaching the table.

What I claim as my invention is—

1. In a supporting-stand, the combination of a bottom piece provided with an opening, legs for holding said bottom piece in a raised position above the table, or other supporting medium, and a plate provided with means for holding it in a raised position above the bottom piece, whereby a space is formed beneath the plate, said plate adapted for supporting a receptacle containing heated contents.

2. In a supporting-stand, the combination of a bottom piece provided with an opening, legs for holding said bottom piece in a raised position above a table, or other supporting medium, a plate provided with means for holding it in a raised position above the bottom piece, whereby a space is formed beneath the plate, said plate adapted for supporting a receptacle containing heated contents, and means for holding the plate against lateral movement on the bottom piece.

3. In a supporting-stand, the combination of a bottom piece provided with an opening, and having a flange extending upwardly from its outer edge, legs for holding said bottom piece in a raised position above the table, or other supporting medium, and a plate disposed within the space of the flange of the bottom piece and supported in a raised position above the bottom piece whereby a space is formed beneath the plate, said plate being of such area as to also leave a space between its outer edge, and the flange of the bottom piece.

4. In a supporting-stand, the combination of a bottom piece provided with an opening, and having a flange extending upwardly from its outer edge, legs for holding said bottom piece in a raised position above the table, or other supporting medium, and a plate disposed within the space of the flange of the bottom piece and vertically removable therefrom, and supported in a raised position above the bottom piece, whereby a space is formed beneath the plate, said plate adapted for supporting a receptacle containing heated contents, and being of such area as to leave a space between its outer edge and the flange of the bottom piece.

5. In a supporting-stand, the combination of a bottom piece provided with an opening, legs for supporting the stand in a raised position above the table, or other supporting medium, a plate provided with means for holding it in a raised position above the bottom piece, whereby a space is formed beneath the plate, said plate adapted for supporting a receptacle containing heated contents, and an outer rim around the bottom piece and the supporting-plate, and connected to said bottom piece, and disposed at a distance from said bottom piece and plate whereby a space is formed between the outer edge of the bottom piece and the inner side of the rim.

6. In a supporting-stand, the combination of a bottom piece provided with an opening, legs for holding the stand in a raised position above the table, or other supporting medium, a plate supported in a raised position above the bottom piece, whereby a space is formed beneath said plate, and an outer rim connected to the bottom piece, said outer rim provided with a series of open spaces or apertures, and said rim also disposed at a distance from the outer edge of the bottom piece, so as to provide a space between said outer edge and the inner side of the rim.

7. In a supporting-stand, the combination of a bottom piece provided with an opening, and having an upwardly-extending flange from its outer edge, legs for holding the stand in a raised position above the table, or other supporting medium, a plate disposed within the space of the flange of the bottom piece and supported in a raised position above the bottom piece whereby a space is formed beneath the plate, said plate being of such area as to provide a space between its outer edge and the flange of the bottom piece, and an outer rim connected to the bottom piece and disposed at a distance from the outer edge of said bottom piece and the upwardly-extending flange of the bottom piece, so as to leave a space.

8. The combination with a supporting-stand provided with a horizontal supporting member, of supporting-legs depending therefrom, and blocks at the lower ends of the legs, said blocks composed of non-heat-conducting material.

9. In a supporting-stand, the combination of a bottom piece provided with an opening and having a flange extending upwardly from its outer edge, legs for holding said bottom piece in a raised position above the table, or other supporting medium, and a plate disposed within the space of the flange of the bottom piece and supported in a raised position above the bottom piece whereby a space is formed beneath the plate, said plate provided at its outer edge with an upwardly-extending flange, and the area of the plate being such as to leave a space between its flange and the flange of the bottom piece.

In testimony whereof I affix my signature in presence of two witnesses.

ALLAN G. PARK.

Witnesses:
FRANK G. BROWN,
FRED. M. BROWN.